US009080661B2

(12) United States Patent
Inakura et al.

(10) Patent No.: US 9,080,661 B2
(45) Date of Patent: Jul. 14, 2015

(54) VEHICLE CONTROL DEVICE AND METHOD

(71) Applicant: AISIN AW CO., LTD., Anjo-shi, Aichi-ken (JP)

(72) Inventors: Tsunekazu Inakura, Anjo (JP); Tetsuya Sano, Nagoya (JP); Takahiro Mizumoto, Anjo (JP); Masatoshi Taguchi, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/347,460

(22) PCT Filed: Dec. 27, 2012

(86) PCT No.: PCT/JP2012/083912
§ 371 (c)(1),
(2) Date: Mar. 26, 2014

(87) PCT Pub. No.: WO2013/100065
PCT Pub. Date: Jul. 4, 2013

(65) Prior Publication Data
US 2014/0244122 A1    Aug. 28, 2014

(30) Foreign Application Priority Data

Dec. 28, 2011   (JP) ................. 2011-289860

(51) Int. Cl.
*F16H 59/00* (2006.01)
*G06F 11/30* (2006.01)

(52) U.S. Cl.
CPC .............. *F16H 59/00* (2013.01); *G06F 11/30* (2013.01); *G06F 11/3013* (2013.01)

(58) Field of Classification Search
None
See application file for complete search history.

(56) References Cited

U.S. PATENT DOCUMENTS

| 5,954,776 A | * | 9/1999 | Saito et al. ................. 701/51 |
| 6,697,995 B1 | | 2/2004 | Yoon |
| 2004/0142793 A1 | * | 7/2004 | Boll et al. .................. 477/77 |
| 2005/0267618 A1 | * | 12/2005 | Kano et al. ................ 700/110 |
| 2006/0053350 A1 | | 3/2006 | Tsuyuno et al. |

FOREIGN PATENT DOCUMENTS

| JP | A-6-160245 | 6/1994 |
| JP | A-7-84602 | 3/1995 |
| JP | A-8-106406 | 4/1996 |
| JP | A-9-160808 | 6/1997 |
| JP | H10-63541 A | 3/1998 |
| JP | A-2001-175497 | 6/2001 |
| JP | A-2002-236600 | 8/2002 |
| JP | A-2006-79230 | 3/2006 |

OTHER PUBLICATIONS

International Search Report issued in International Patent Application No. PCT/JP2012/083912 mailed Apr. 2, 2013.

* cited by examiner

*Primary Examiner* — Edwin A Young
(74) *Attorney, Agent, or Firm* — Oliff PLC

(57) ABSTRACT

A vehicle control device that includes a computer which controls an in-vehicle device provided in a vehicle. The control device can be configured with a main processing unit that performs a process for operating the in-vehicle device, and a safety function processing unit that performs a safety function process for detecting a dangerous state of the in-vehicle device which is operated according to the process performed by the main processing unit and bringing the in-vehicle device into a safe state. The safety function processing unit may include execution order monitoring means for monitoring whether an execution order of the safety function process is correct when the safety function process is performed.

6 Claims, 4 Drawing Sheets

VEHICLE CONTROL DEVICE AND METHOD

TECHNICAL FIELD

The present invention relates to a vehicle control device including a computer which controls an in-vehicle device provided in a vehicle and a vehicle control method using the computer.

BACKGROUND ART

As an arithmetic device which can detect program runaway, there has been known an arithmetic device that counts the reference clock of an arithmetic unit that executes a program and transmits an interrupt request to the arithmetic unit for each predetermined value (for example, see Patent Document 1). The arithmetic device determines whether the execution address of the program is within a predetermined range during the interrupt process and determines that the program is in a runaway state when the execution address of the program is not within the predetermined range. In addition, as a semiconductor circuit device which includes a command processing unit for performing a process according to a program and detects the runaway of program execution in the command processing unit, a device has been known that determines the address of a program space accessed by the command processing unit, performs a return process as a response when it is determined that the command processing unit accesses the address of a unimplemented space, and stops the runaway to the unimplemented space (for example, see Patent Document 2). Further, as a multi-task program runaway detection device which divides a program into a plurality of task programs and executes the task programs in a predetermined order, a device has been known that includes a plurality of task program storage means for storing task programs, switching means for switching the task programs stored in the task program storage means to a task program designated by instruction means, and determination means for determining whether a program address based on the task program which is being executed is within the range of the program address of the designated task program and determining that runaway occurs when the program address is not within the range (for example, see Patent Document 3).

RELATED ART DOCUMENTS

Patent Documents

[Patent Document 1] Japanese Patent Application Publication No. 2002-236600 (JP 2002-236600 A)
[Patent Document 2] Japanese Patent Application Publication No. 2006-079230 (JP 2006-079230 A)
[Patent Document 3] Japanese Patent Application Publication No. 08-106406 (JP 8-106406 A)

SUMMARY OF THE INVENTION

The program runaway detection technique according to the related art basically performs only the process of monitoring whether the process which is currently being performed is included in a predetermined address (program address), but cannot monitor whether the program which should be originally performed is performed. Therefore, the program runaway detection technique according to the related art is insufficient for a vehicle control device including a computer that controls an in-vehicle device, in terms of ensuring the safety of the vehicle. In the vehicle control device, a control process for operating the in-vehicle device is complicated. Thus, when the execution states of all processes are monitored, a calculation load increases, which hinders the smooth execution of various processes.

An object of the present invention is to provide a vehicle control device and method which can more appropriately control an in-vehicle device such that the safety of the vehicle is ensured while suppressing an increase in calculation load.

The vehicle control device and the vehicle control method according to the present invention have the following means in order to achieve the above-mentioned object.

A vehicle control device according to the present invention includes a computer which controls an in-vehicle device provided in a vehicle. The vehicle control device is characterized by including:

a main processing unit that performs a process for operating the in-vehicle device; and a safety function processing unit that performs a safety function process for detecting a dangerous state of the in-vehicle device which is operated according to the process performed by the main processing unit and bringing the in-vehicle device into a safe state, wherein the safety function processing unit includes execution order monitoring means for monitoring whether an execution order of the safety function process is correct when the safety function process is performed.

The vehicle control device includes the main processing unit that performs the process for operating the in-vehicle device and the safety function processing unit that performs the safety function process for detecting the dangerous state of the in-vehicle device which is operated according to the process performed by the main processing unit and bringing the in-vehicle device into a safe state. The safety function processing unit includes the execution order monitoring means for monitoring whether the execution order of the safety function process is correct when the safety function process is performed. Thus, when the execution order monitoring means is provided in the safety function processing unit and it is monitored whether the execution order of the safety function process for ensuring a safety function, among various processes performed during the control of the in-vehicle device, is correct, it is possible to suppress the safety function process from being performed in an order different from the original execution order and to reliably ensure the safety of the vehicle, without monitoring the execution state of the process performed by the main processing unit. Therefore, it is possible to more appropriately control the in-vehicle device such that the safety of the vehicle is ensured, while suppressing an increase in calculation load. Note that the safety function process whose correct execution order is monitored may be one task or may be a process which is called when a given task is executed (a subroutine, a function or the like).

The execution order monitoring means may include definition means for defining a safety function process to be performed and determination means for determining whether the safety function process defined by the definition means is performed. With this, it is possible to more appropriately monitor whether the execution order of the safety function process is correct.

The execution order monitoring means may include post-branch process definition means for defining a post-branch process to be performed after a branch when the safety function process includes a branch process and branch determination means for determining whether the post-branch process defined by the post-branch process definition means is performed. With this, when the safety function process including the branch process is performed, it is possible to more appropriately monitor whether the execution order of the post-branch process is correct.

The safety function processing unit may further include execution cycle monitoring means for monitoring whether an execution cycle of the safety function process is within a normal range, independently from the execution of the safety function process, when the safety function process is a repetitive process which is repeatedly performed in a predetermined cycle. Thus, when the execution cycle of the safety function process, which is a repetitive process, is monitored, it is possible to suppress the safety function process from being performed in a cycle different from the original execution cycle and to reliably ensure the safety of the vehicle. The execution cycle may be monitored by, for example, a function which is independent from the safety function process (repetitive process) in one task, a task different from the task including the repetitive process, or a computer different from the computer in which the main processing unit or the safety function processing unit is constructed.

The in-vehicle device may be a power transmission device that transmits power from a motor to driving wheels of the vehicle.

A vehicle control method according to the present invention uses a computer which controls an in-vehicle device provided in a vehicle. The vehicle control method includes:
performing a main process for operating the in-vehicle device and a safety function process for detecting a dangerous state of the in-vehicle device which is operated according to the main process and bringing the in-vehicle device into a safe state; and
monitoring whether an execution order of the safety function process is correct only when the safety function process is performed.

According to the above-mentioned method, it is possible to more appropriately control the in-vehicle device such that the safety of the vehicle is ensured, while suppressing an increase in calculation load.

MODES FOR CARRYING OUT THE INVENTION

Hereinafter, an embodiment of the present invention will be described using examples.

Figure 1:
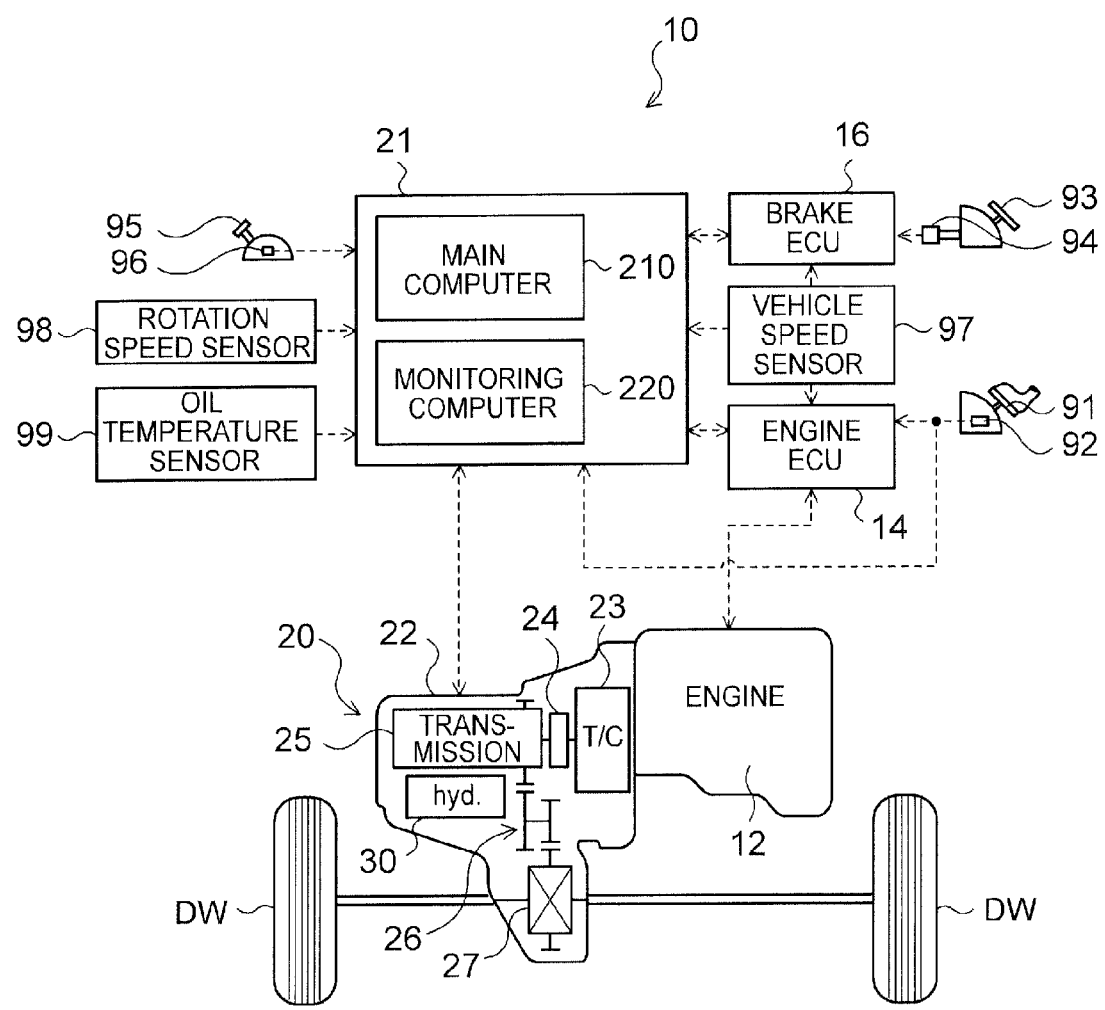
FIG. 1 is a schematic diagram illustrating the structure of a vehicle 10 including a vehicle control device according to the present invention.

FIG. 1 is a schematic diagram illustrating the structure of a vehicle 10 including a vehicle control device according to the present invention. The vehicle 10 shown in FIG. 1 includes: an engine 12 serving as a motor which is an internal-combustion engine that outputs power generated by the explosive combustion of an air-fuel mixture of air and hydrocarbon-based fuel, such as gasoline or diesel oil; an engine electronic control unit (hereinafter, referred to as an "engine ECU") 14 which controls the engine 12; a brake electronic control unit (hereinafter, referred to as a "brake ECU") 16 which controls an electronic-control-type hydraulic brake unit (not shown); a power transmission device 20 serving as an in-vehicle device which is connected to a crankshaft of the engine 12 and transmits power from the engine 12 to left and right driving wheels DW; and a shifting electronic control unit (hereinafter, referred to as a "shifting ECU") 21 serving as the vehicle control device according to the present invention which controls the power transmission device 20.

The engine ECU 14 is configured as a micro computer including a CPU (not shown) as a main component and includes, for example, a RUM which stores various programs, a RAM which temporarily stores data, an input/output port, and a communication port (all not shown), in addition to the CPU. As shown in FIG. 1, input to the engine ECU 14 are: an accelerator operation amount Acc output from an accelerator pedal position sensor 92 which detects the depression amount (operation amount) of an accelerator pedal 91; a vehicle speed V output from a vehicle speed sensor 97; signals output from various sensors, such as a crankshaft position sensor (not shown) which detects the rotational position of the crankshaft; signals output from the brake ECU 16 or the shifting ECU 21; and the like. The engine ECU 14 controls, for example, an electronically-controlled throttle valve, fuel injection valve, and spark plugs (all not shown) on the basis of these signals.

The brake ECU 16 is also configured as a micro computer including a CPU (not shown) as a main component and includes, for example, a ROM which stores various programs, a RAM which temporarily stores data, an input/output port, and a communication port (all not shown), in addition to the CPU. As shown in FIG. 1, input to the brake ECU 16 are: a master cylinder pressure which is detected by a master cylinder pressure sensor 94 when a brake pedal 93 is depressed; the vehicle speed V output from the vehicle speed sensor 97; signals output from various sensors (not shown); signals output from the engine ECU 14 or the shifting ECU 21; and the like. The brake ECU 16 controls, for example, a brake actuator (hydraulic actuator) (not shown) on the basis of these signals.

The power transmission device 20 includes a torque converter (hydraulic power transmission device) 23, an oil pump 24, a transmission 25 which is, for example, a stepped automatic transmission, a gear mechanism 26, a differential mechanism (differential gear) 27, a hydraulic control device 30, and the like which are accommodated in a transmission case 22. The torque converter 23 includes an input-side pump impeller which is connected to the crankshaft of the engine 12, an output-side turbine runner which is connected to an input shaft (input member) of the transmission 25, a stator, a lock-up clutch, a damper mechanism, and the like (all not shown). Note that a fluid coupling without a stator may be used instead of the torque converter 23. The oil pump 24 is configured as a gear pump that includes a pump assembly including a pump body and a pump cover and an external gear which is connected to a pump impeller a of the torque converter 23 through a hub. The oil pump 24 sucks hydraulic oil (ATF) which is stored in an oil pan (not shown) using the power from the engine 12 and pumps out the hydraulic oil to the hydraulic control device 30.

The transmission 25 can transmit power transmitted to the input shaft to the output shaft while changing a shift speed in a plurality of stages, and includes, for example, a plurality of planetary gear mechanisms and a plurality of clutches, brakes, and one-way clutches for changing a power transmission path from the input shaft to the output shaft. The output shaft of the transmission 25 is connected to the driving wheels DW through the gear mechanism 26 and the differential mechanism 27. The clutches and the brakes are engaged or disengaged by the hydraulic pressure from the hydraulic control device 30. The transmission 25 may be configured as a continuously variable transmission of a belt type or other types. The hydraulic control device 30 includes, for example, a plurality of solenoid valves and relay valves provided in a valve body, generates hydraulic pressure required by the torque converter 23 or the transmission 25, and supplies hydraulic oil to lubricating portions, such as various bearings.

Figure 2:
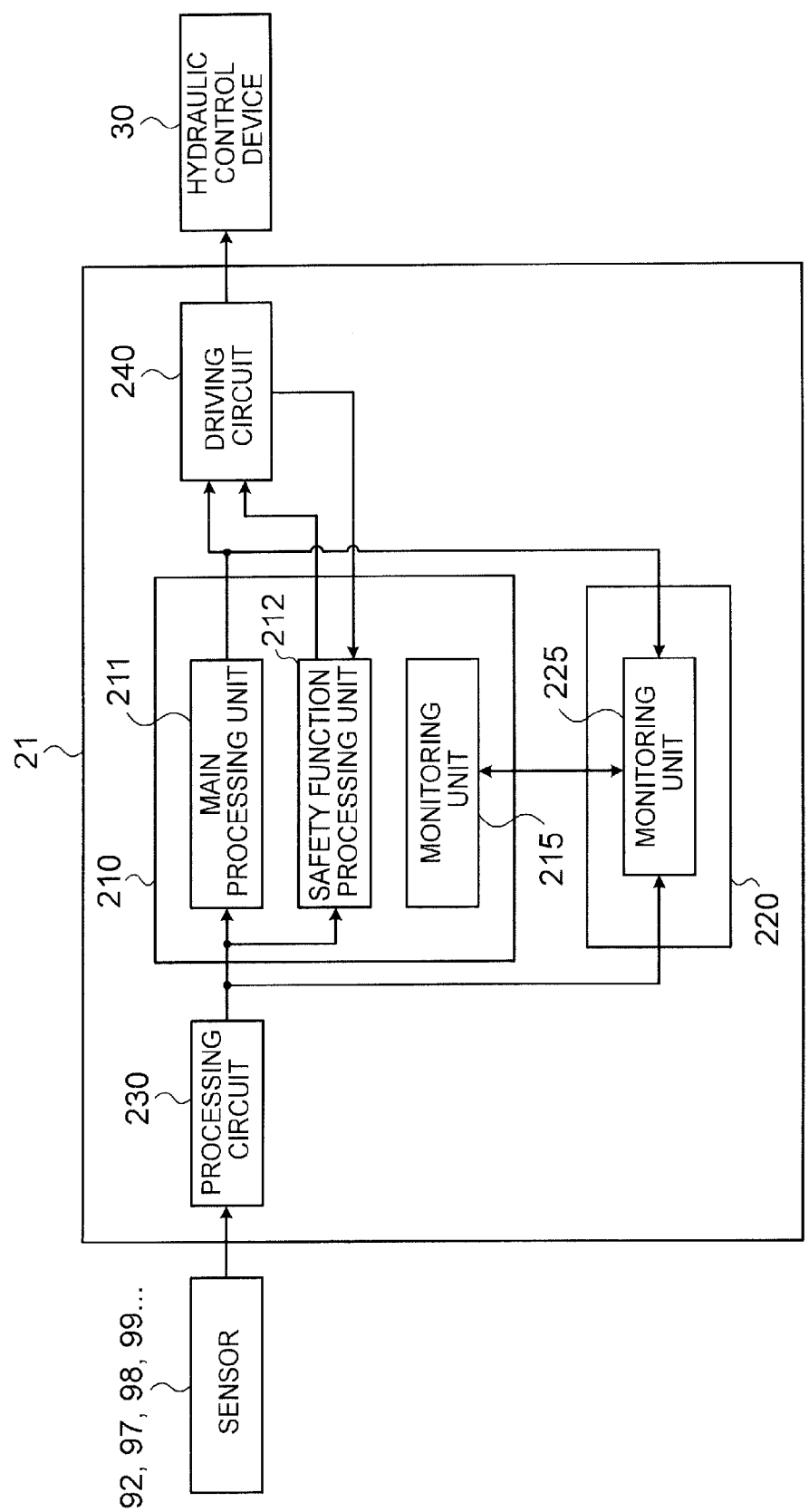
FIG. 2 is a control block diagram of the vehicle control device according to the present invention.

As shown in FIG. 2, the shifting ECU 21, which is a control device for the power transmission device 20, includes: a main computer 210; a monitoring computer (sub-computer) 220; a processing circuit 230 which processes signals from various sensors such as the vehicle speed sensor 97, a rotation speed sensor 98, and an oil temperature sensor 99; and a driving circuit 240 which controls the driving of the hydraulic control device 30. The main computer 210 and the monitoring computer 220 are each configured as a micro computer including a CPU (not shown) as a main component and each include, for example, a ROM which stores various programs, a RAM which temporarily stores data, an input/output port, and a communication port (all not shown), in addition to the CPU. As shown in FIG. 1, input to the shifting ECU 21 are: the accelerator operation amount Acc output from the accelerator pedal position sensor 92, the vehicle speed V output from the vehicle speed sensor 97; a shift range SR output from a shift range sensor 96 which detects the operation position of a shift lever 95 for selecting a desired shift range from a plurality of shift ranges; signals output from various sensors, such as a rotation speed sensor 98 which detects a rotation speed input to the transmission 25 and an oil temperature sensor 99 which detects the oil temperature in the hydraulic control device 30; signals output from the engine ECU 14 or the brake ECU 16; and the like. The shifting ECU 21 controls the torque converter 23 and the transmission 25, namely, the hydraulic control device 30 on the basis of these signals.

As shown in FIG. 2, in the main computer 210 of the shifting ECU 21, a main processing unit 211, a safety function processing unit 212, and a monitoring unit 215 are configured as functional blocks by the cooperation of hardware such as a CPU, a ROM, and a RAM and software such as a program installed in the ROM. The main processing unit 211 performs various kinds of processes (main processes) for operating the torque converter 23 and the transmission 25, that is, the overall control operation of the hydraulic control device 30. The safety function processing unit 212 performs a safety function process, such as various tasks, subroutines, macros, functions or the like, for detecting the dangerous state of the power transmission device 20 including the torque converter 23, the transmission 25, the hydraulic control device 30, and the like and for bringing the power transmission device 20 into a safe state. The monitoring unit 215 monitors whether an error occurs in the shifting ECU 21 (hardware), together with the monitoring computer 220. As shown in the drawing, in the monitoring computer 220, a monitoring unit 225 which performs the same process as the monitoring unit 215 of the main computer 210 is constructed by the cooperation of hardware such as a CPU, a ROM, and a RAM and software such as a program installed in the ROM.

As shown in FIG. 2, signals output from various sensors, such as the accelerator pedal position sensor 92, the vehicle speed sensor 97, the rotation speed sensor 98, and the oil temperature sensor 99, are input to the main processing unit 211 of the main computer 210 through the processing circuit 230. The main processing unit 211 generates a command signal on the basis of the signals that are input from various sensors through the processing circuit 230 or the signals from the engine ECU 14 or the brake ECU 16 and transmits the command signal to the driving circuit 240. Then, the driving circuit 240 controls the driving of the hydraulic control device 30 in response to the command signal from the main processing unit 211. The signals output from various sensors, such as the accelerator pedal position sensor 92, the vehicle speed sensor 97, the rotation speed sensor 98, and the oil temperature sensor 99 are input to the safety function processing unit 212 of the shifting ECU 21 through the processing circuit 230. The signals output from the driving circuit 240 are also input to the safety function processing unit 212 of the shifting ECU 21. The safety function processing unit 212 performs, on the basis of the input signals, a safety function process for detecting the dangerous state of the power transmission device 20 including the torque converter 23, the transmission 25, the hydraulic control device 30 and the like and bringing the power transmission device 20 into a safe state, so as to generate a command signal, and transmits the command signal to the driving circuit 240. The monitoring unit 215 of the main computer 210 checks the CPU, the RAM, the ROM, and the like of the main computer 210 to monitor whether there is an error in hardware. The monitoring unit 225 of the monitoring computer 220 receives the output signal from the main processing unit 211 or the signals output from various sensors through the processing circuit 230 and monitors whether there is an error in hardware on the basis of the received signals. In this embodiment, the signals that are input from various sensors to the safety function processing unit 212 are such signals that the accuracy thereof is improved to meet the international standard by structuring in advance hardware or software on the basis of the international standard.

The "dangerous state" means, for example, a state in which a shift speed with a higher gear ratio than a shift speed that is set according to a predetermined shift map is set in the transmission 25, a state in which acceleration that is not intended by the driver occurs in the vehicle 10, such as a state in which a torque-up amount more than a predetermined torque-up amount of the engine 12 is instructed from the shifting ECU 21 to the engine ECU 14, or a state in which deceleration that is not intended by the driver occurs in the vehicle 10, such as a state in which a clutch etc. other than the clutch or brake which is scheduled to be engaged for each shift speed of the transmission 25 is engaged. In addition, the "safe state" means, for example, a state in which the transmission 25 is in neutral to disable power transmission of the transmission 25 or a state in which the supply of power to all of the solenoid valves of the hydraulic control device 30 is cut to cause the transmission 25 to form a predetermined shift speed (a so-called limp-home state).

Next, the execution procedure of the safety function process performed by the safety function processing unit 212 of the shifting ECU 21 will be described with reference to FIGS. 3 to 5.

Figure 3:
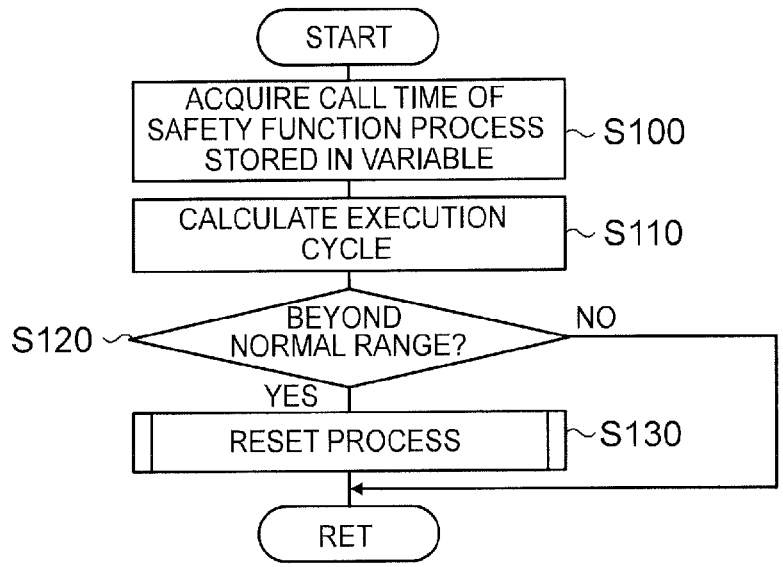
FIG. 3 is a flowchart illustrating an example of the monitoring procedure of an execution cycle of a safety function process.

FIG. 3 is a flowchart illustrating a series of processes which is repeatedly performed by the safety function processing unit 212 to monitor the execution cycle of the safety function process when the safety function process, which is a repetitive process, is performed by the safety function processing unit 212. The series of processes shown in FIG. 3 is performed by a function or the like that is independent from the safety function process (repetitive process) in one task or by a task different from the task including a target safety function process (repetitive process).

The series of processes shown in FIG. 3 is performed in a predetermined cycle (for example, at an interval of 100 mSec). First, the time (system time) when the target safety function process is called is acquired from a predetermined variable (Step S100). The call time of the safety function process is stored in the variable whenever the safety function process is called by the execution of the program. Then, the execution cycle of the target safety function process is calculated on the basis of the call time acquired in Step S100 (Step S110). In Step S110, the difference between the call time input in Step S100 and the initial call time of the target safety function process or the call time acquired in last Step S100 is calculated as the execution cycle. When the execution cycle is calculated, it is determined whether the calculated execution cycle is beyond a predetermined normal range (Step S120). When the execution cycle calculated in Step S110 is within the normal range, the series of processes shown in FIG. 3 ends in this stage. On the other hand, when the execution cycle calculated in Step S110 is beyond the normal range, it is considered that an error occurs in the main computer 210 and the main computer 210 is reset (Step S130). When the reset process is completed, the series of processes shown in FIG. 3 ends in this stage. The reset process includes, for example, a process of stopping the safety function process in the main computer or a process of cancelling (invalidating) the output signal from the main computer.

As described above, since the execution cycle of the safety function process which is repeatedly performed is monitored, it is possible to suppress the safety function process from being performed in a cycle different from the original execution cycle and to reliably ensure the safety of the vehicle 10. The series of processes shown in FIG. 3 may be performed by the monitoring computer 220 different from the main computer 210 which is configured by the main processing unit 211 or the safety function processing unit 212.

Figure 4:
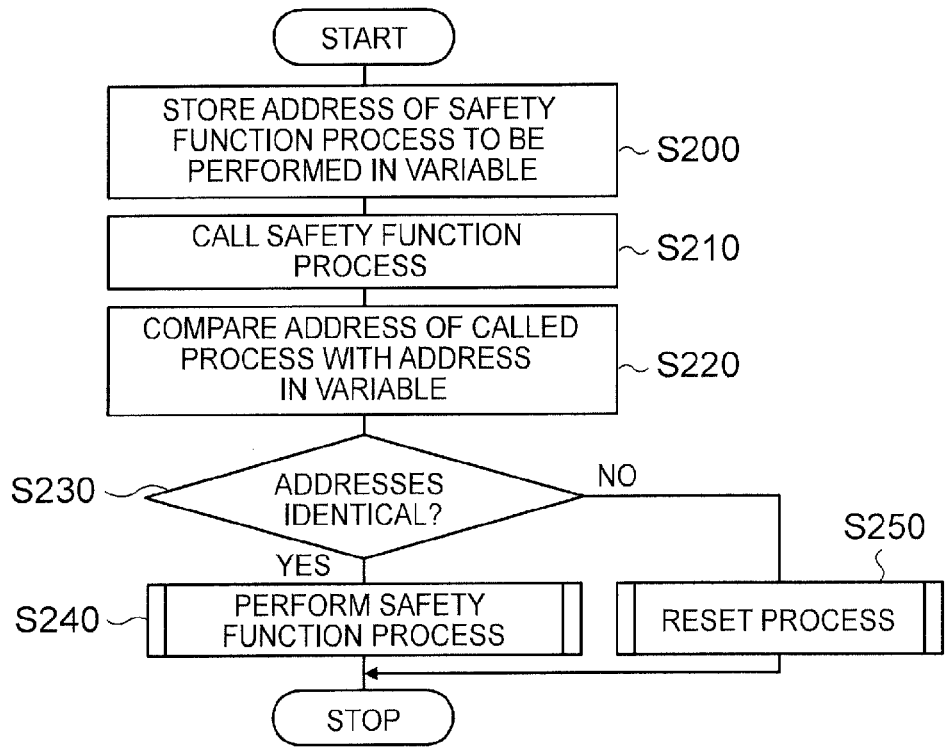
FIG. 4 is a flowchart illustrating an example of the execution procedure of the safety function process.

FIG. 4 is a flowchart illustrating an example of the execution procedure of the safety function process performed by the safety function processing unit 212. Here, a series of processes shown in FIG. 4 may be applied to a safety function process, which is one task, or may be a safety function process (a subroutine, a macro, a function, or the like) which is called when a given task is performed.

As shown in FIG. 4, when the safety function process is performed, first, the address of the safety function process to be performed in the ROM of the main computer 210 is acquired and stored in a predetermined variable (Step S200). Then, the safety function process to be performed is defined. After Step S200, the safety function process to be performed is called and stored in the RAM (Step S210). The address of the process called in Step S210 is compared with the address stored in the variable (Step S220). The address of the process called in Step S210 in the ROM is described in a program code of the process. When the address of the process called in Step S210 is identical to the address stored in the variable (Yes in Step S230), the process called in Step S210, that is, the safety function process defined in Step S200 is performed (Step S240). When the execution of the safety function process is completed, the series of processes shown in FIG. 4 ends. In contrast, when the address of the process called in Step S210 is not identical to the address stored in the variable (No in Step S230), a process of resetting the main computer 210 is performed (Step S250). When the reset process is completed, the series of processes shown in FIG. 4 ends.

Thus, the address of the safety function process to be performed in the ROM of the main computer 210 is stored in the variable and the safety function process to be performed is defined (Step S200). Then, the address of the process which is actually called is compared with the address stored in the variable and it is determined whether the defined safety function process is performed (Steps S220 and S230). Therefore, it is possible to more appropriately monitor whether the execution order of the safety function process is correct. As a result, for example, even when program runaway occurs due to an error in the CPU or the like, the reset process is performed to stop the runaway and it is possible to more appropriately control the power transmission device 20 such that the safety of the vehicle 10 is ensured.

Figure 5:
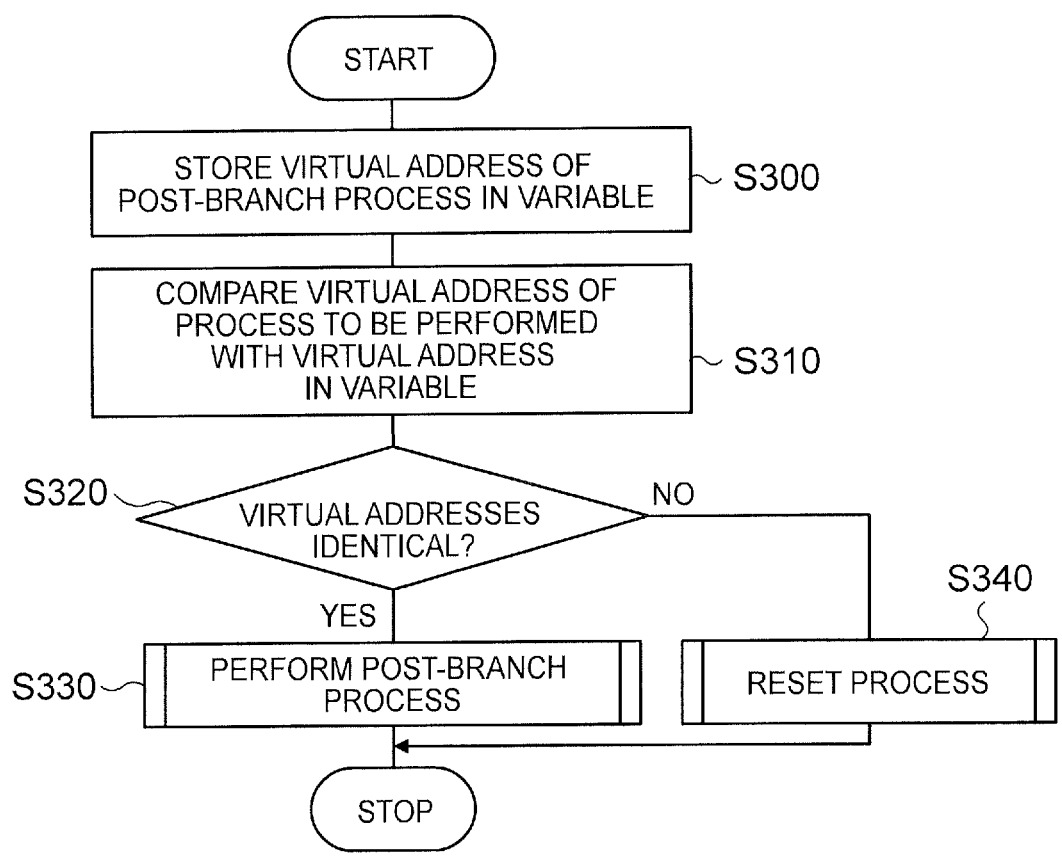
FIG. 5 is a flowchart illustrating another example of the execution procedure of the safety function process.

FIG. 5 is a flowchart illustrating another example of the execution procedure of the safety function process performed by the safety function processing unit 212. A series of processes shown in FIG. 5 is performed when the safety function process to be performed includes a branch process.

As shown in FIG. 5, when the safety function process including the branch process is performed, first, the virtual address of a post-branch process which will be performed after the branch process by a so-called if statement, a so-called while statement, a so-called switch statement, or the like is stored in a predetermined variable (Step S300). Thus, the post-branch process to be performed is defined. Here, it is not easy to acquire the address (actual address) of the post-branch process in the ROM, compared to the case where the safety function process (a subroutine, a macro, a function, or the like) itself is called as described with reference to FIG. 4. In this embodiment, therefore, in the program related to the safety function process including the branch process, the virtual address of the post-branch process which is actually performed after the branch is defined as a constant. In Step S300, the virtual address of the post-branch process corresponding to the branch result is stored in the variable. Then, after Step S300, the address of the process which is actually performed after the branch is compared with the virtual address stored in the variable (Step S310). When the virtual address of the process which is performed after the branch is identical to the virtual address stored in the variable (Yes in Step S320), the process, that is, the post-branch process defined in Step S300 is performed (Step S330). When the post-branch process is completed, the series of processes shown in FIG. 5 ends. In contrast, when the virtual address of the process which is actually performed after the branch is not identical to the virtual address stored in the variable (No in Step S320), the process of resetting the main computer 210 is performed (Step S340). When the reset process is completed, the series of processes shown in FIG. 5 ends.

Thus, when the safety function process to be performed includes the branch process, the virtual address is stored in the variable and the post-branch process which will be performed after the branch is defined (Step S300). Then, the virtual address of the process which is actually performed after the branch is compared with the address stored in the variable and it is determined whether the defined post-branch process is performed (Steps S310 and S320). Therefore, it is possible to more appropriately monitor whether the execution order of the post-branch process is correct.

As described above, the main computer 210 of the shifting ECU 21 serving as the vehicle control device includes the main processing unit 211 which performs a plurality of processes for operating the power transmission device 20 that serves as an in-vehicle device, and the safety function processing unit 212 which performs a plurality of safety function processes for detecting the dangerous state of the power transmission device 20 and bringing the power transmission device 20 into a safe state. The safety function processing unit 212 monitors whether the execution order of the safety function process is correct according to the procedure shown in FIG. 3 or FIG. 4 when the safety function process is performed. Thus, when it is monitored whether the execution order of the safety function process for ensuring a safety function, among various processes performed during the control of the power transmission device 20, is correct, it is possible to prevent the safety function process from being performed in an order different from the original execution order and to reliably ensure the safety of the vehicle 10, without monitoring the execution state of the process performed by the main processing unit 211. Therefore, it is possible to more appropriately control the power transmission device 20 such that the safety of the vehicle 10 is ensured, while preventing an increase in the calculation load of the main processing unit 211. In this embodiment, the shifting ECU 21 includes the main computer 210 and the monitoring computer (sub-computer) 220. However, the monitoring computer 220 may be omitted from the shifting ECU 21.

Next, the correspondence relationship between the main components of the embodiment and the main components described in the Summary of the Invention will be described. That is, in the above-described embodiment, the shifting ECU 21 including the main computer 210 which controls the power transmission device 20 serving as an in-vehicle device and provided in the vehicle 10 corresponds to a "vehicle control device". The main processing unit 211 which performs various processes for operating the power transmission device 20 corresponds to a "main processing unit". The safety function processing unit 212 which performs the safety function process for detecting the dangerous state of the power transmission device 20 and bringing the power transmission device 20 into a safe state corresponds to a "safety function processing unit". Steps S200 to S230 shown in FIG. 4 or Steps S300 to S320 shown in FIG. 5 which monitor whether the execution order of the safety function process is correct when the safety function process is performed correspond to "execution order monitoring means". Step S200 shown in FIG. 4 corresponds to "definition means" for defining the safety function process to be performed. Steps S220 and S230 shown in FIG. 4 correspond to "determination means" for determining whether the safety function process defined by the definition means is performed. Step S300 shown in FIG. 5 corresponds to "post-branch process definition means" for defining a post-branch process to be performed after a branch. Steps S310 and S320 shown in FIG. 5 correspond to "branch determination means" for determining whether the defined post-branch process is performed. Steps S100 to S120 shown in FIG. 3 correspond to "execution cycle monitoring means" for monitoring whether the execution cycle of the safety function process is within a normal range, independently from the execution of the safety function process, when the safety function process is a repetitive process which is repeatedly performed in a predetermined cycle.

However, the correspondence relationship between the main components of the embodiment and the main components described in the Summary of the Invention does not limit the components described in the Summary of the Invention since the embodiment is an example for specifically describing the mode for carrying out the invention described in the Summary of the Invention. That is, the embodiment is a specific example of the invention described in the Summary of the Invention, and the invention described in the Summary of the Invention should be interpreted on the basis of the description in the Summary of the Invention.

The embodiment of the present invention has been described using the example. However, the present invention is not limited to the example, and various modifications and changes of the present invention can be made without departing from the scope and spirit of the present invention.

INDUSTRIAL APPLICABILITY

The present invention can be used in the manufacturing industry of vehicles or in-vehicle devices.

The invention claimed is:

1. A vehicle control device that includes a computer which controls an in-vehicle device provided in a vehicle, comprising:
a main processing unit that performs a process for operating the in-vehicle device; and
a safety function processing unit that performs a safety function process for detecting a dangerous state of the in-vehicle device which is operated according to the process performed by the main processing unit and bringing the in-vehicle device into a safe state, wherein
the safety function processing unit includes execution order monitoring means for monitoring whether an execution order of the safety function process is correct when the safety function process is performed.

2. The vehicle control device according to claim 1, wherein the execution order monitoring means includes:
definition means for defining a safety function process to be performed; and
determination means for determining whether the safety function process defined by the definition means is performed.

3. The vehicle control device according to claim 1, wherein the execution order monitoring means includes:
post-branch process definition means for defining a post-branch process to be performed after a branch when the safety function process includes a branch process; and
branch determination means for determining whether the post-branch process defined by the post-branch process definition means is performed.

4. The vehicle control device according to claim 1, wherein the safety function processing unit further includes execution cycle monitoring means for monitoring whether an execution cycle of the safety function process is within a normal range, independently from the execution of the safety function process, when the safety function process is a repetitive process which is repeatedly performed in a predetermined cycle.

5. The vehicle control device according to claim 1, wherein the in-vehicle device is a power transmission device that transmits power from a motor to driving wheels of the vehicle.

6. A vehicle control method using a computer which controls an in-vehicle device provided in a vehicle, comprising:
performing a main process for operating the in-vehicle device and a safety function process for detecting a dangerous state of the in-vehicle device which is operated according to the main process and bringing the in-vehicle device into a safe state; and
monitoring whether an execution order of the safety function process is correct only when the safety function process is performed.

* * * * *